(12) United States Patent
Sunavala et al.

(10) Patent No.: US 7,865,774 B2
(45) Date of Patent: Jan. 4, 2011

(54) MULTIPROCESSOR CORE DUMP RETRIEVAL

(75) Inventors: Farhad Sunavala, Milpitas, CA (US); Kevin Franklin Clayton, Cary, NC (US); Bhaskar Bhupalam, Sunnyvale, CA (US); Jorge Manuel Gonzalez, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 591 days.

(21) Appl. No.: 11/857,633

(22) Filed: Sep. 19, 2007

(65) Prior Publication Data
US 2009/0077420 A1    Mar. 19, 2009

(51) Int. Cl.
*G06F 11/00* (2006.01)
(52) U.S. Cl. ......................................................... 714/31
(58) Field of Classification Search ............. 714/10–13, 714/18, 19, 21, 22, 30–32, 34, 35, 39, 45
See application file for complete search history.

(56) References Cited

U.S. PATENT DOCUMENTS

| | | | |
|---|---|---|---|
| 6,473,857 B1 * | 10/2002 | Panas et al. ..................... 713/2 |
| 7,062,677 B1 | 6/2006 | Chigurapati | |
| 7,114,104 B1 * | 9/2006 | Bennett ......................... 714/38 |
| 2005/0278459 A1 * | 12/2005 | Boucher et al. ............. 709/250 |
| 2007/0006164 A1 * | 1/2007 | Sethi et al. ................... 717/127 |
| 2008/0005609 A1 * | 1/2008 | Zimmer et al. ................. 714/5 |
| 2008/0244168 A1 * | 10/2008 | Warrier et al. .............. 711/105 |

OTHER PUBLICATIONS

"Next-Generation Power QUICC III Processors", Product Fact Sheet [online] Freescale Semiconductor, Inc., 2004 [retrieved on May 4, 2007]. Retrieved from the Internet: <URL: http://www.freescale.com/files/netcomm/doc/fact_sheet/MPC8548FS.pdf>, 4 p.

* cited by examiner

*Primary Examiner*—Nadeem Iqbal
(74) *Attorney, Agent, or Firm*—Schwegman, Lundberg & Woessner, P.A.

(57) ABSTRACT

In particular embodiments, a monitoring processor may receive an interrupt from status monitoring logic associated with a monitored processor that has experienced an error. Interrupt logic at the monitoring processor may interrupt the monitored processor to initiate a standby mode of operation in the monitored processor. Core dump logic at the monitoring processor may retrieve a core dump from a memory associated with the monitored processor via a communication channel connecting the monitoring processor to the monitored processor or to the memory. Other embodiments are disclosed and claimed.

21 Claims, 5 Drawing Sheets

MULTIPROCESSOR CORE DUMP RETRIEVAL

TECHNICAL FIELD

The present disclosure relates generally to retrieving processor core dumps.

BACKGROUND

A core file is a memory image associated with a computer process that has terminated or become corrupted as a result of one or more errors. Errors that may cause termination or corruption of a computer process include memory violations, bus errors, illegal instructions, user-generated quit signals, and others. It is generally recognized in the art that analysis of a core file may be helpful in determining the nature and cause of process-termination events.

The process of transferring a core file from volatile memory to a non-volatile storage medium is referred to as a "core dump." The dumped core file may also be referred to as a core dump. Retrieving the core file from an embedded system may be problematic, because the embedded system may not include a non-volatile mass storage device. Non-volatile storage devices typically associated with embedded systems may include flash memory modules with insufficient capacity to store a volatile core file from dynamic random-access memory (DRAM) following a process termination.

Some systems transfer core dumps to mass storage across a network connection. However, such methods may fail if the networking functionality of the embedded system is non-functional as a result of the process-terminating event. These problems may be compounded in a multi-processor or multi-core embedded system, particularly if processes are interdependent between processors.

DESCRIPTION OF EXAMPLE EMBODIMENTS

Example embodiments described herein may retrieve core dumps from a single-processor or multi-processor system that experiences an error. Although particular example embodiments may be discussed in a single-processor or multi-processor context, both architectures are comprehended herein.

Overview

Embodiments herein may receive an interrupt at a monitoring processor from status monitoring logic associated with a monitored processor experiencing an error ("errored processor"). In particular multi-processor embodiments the errored processor may comprise one of several monitored processors. The monitoring processor may in turn interrupt one or more of the monitored processors to initiate a standby mode of operation in one or more of the monitored processors. The monitoring processor may also retrieve a core dump from one or more memories associated with the monitored processors. The core dumps may be transferred via a communication channel connecting the monitoring processor to the monitored processors or to the associated memories.

Figure 1:
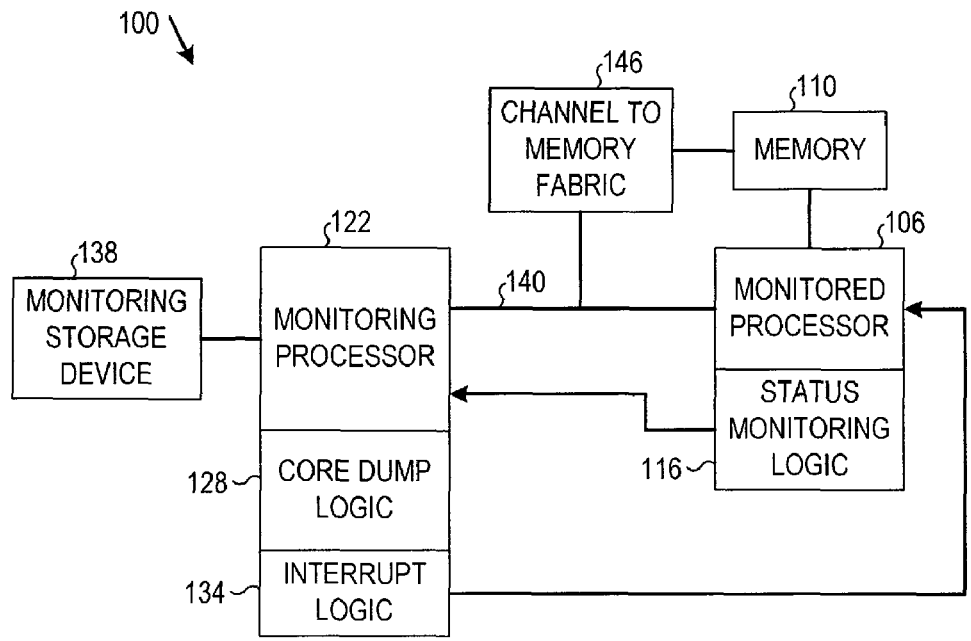
FIGS. 1-5 illustrate example apparatus for retrieving processor core dumps.

FIG. 1 illustrates an example apparatus 100 for retrieving processor core dumps. The apparatus 100 may include one or more monitored processors (e.g., the monitored processor 106) and one or more memories (e.g., the memory 110) associated with the monitored processor 106. The memory 110 may comprise a main operational random access memory (RAM) bank, including dynamic RAM (DRAM) or static RAM (SRAM), among others. The memory 110 may also include flash memory and other peripheral memory of various types and functions associated with the monitored processor 106.

The apparatus 100 may further include status monitoring logic 116 coupled to the monitored processor 106. In particular embodiments the status monitoring logic 116 may comprise a watchdog timer. "Status monitoring" as used herein refers to activities associated with determining whether hardware and software processes are executing on a computer platform within a predetermined operational range. For example, an operating system may require that a software process update a status flag no less often than once every ten milliseconds. A software process that does not update the status flag within ten milliseconds may be defined as operating outside of the defined operational range.

A "watchdog timer" is a timer that monitors the interval between status flag updates. The watchdog timer may perform a predetermined remedial function if the maximum period between status flag updates is exceeded.

The status monitoring logic 116 may detect an error condition associated with an operation of the monitored processor 106. That is, the status monitoring logic 116 may determine that the monitored processor 106 is operating outside the predetermined operational range as described above. In particular embodiments the error condition may comprise a memory violation, a bus error, an illegal instruction, or a user-generated quit signal, among others. The error condition may result in an abnormal process termination.

A monitoring processor 122 may be coupled to the monitored processor 106. The monitoring processor 122 may receive an interrupt from the monitored processor 106 in response to the error condition. An "interrupt" as used herein is a signal exerted at control logic associated with a computer which, when exerted, causes the control logic to interrupt the normal process flow and to initiate execution of a process responsive to the particular type of interrupt.

Core dump logic 128 may be coupled to the monitoring processor 122. The core dump logic 128 may operate to force the monitored processor 106 into a standby mode of operation. In particular embodiments the standby mode of operation may comprise one or more spin loops. A "spin loop" as used herein is a form of software lock. A process in a spin loop "spins" by repeatedly checking for a lock to become available. Because the process remains active but may not perform a useful task, a spin loop comprises a type of busy waiting well know to those skilled in the art.

In particular embodiments, interrupt logic 134 may be coupled to the core dump logic 128. The interrupt logic 134 may generate a high-priority interrupt to initiate the standby mode of operation in the monitored processor 106. Having thus inhibited further state changes in the memory 110 by write operations from the monitored processor 106, the core dump logic 128 may operate to retrieve the core dump from the memory 110 and to store the core dump at a monitoring storage device 138.

The apparatus 100 may further include a communication channel 140 communicatively coupled to the monitoring processor 122. The communication channel 140 may comprise a peripheral component interconnect (PCI) bus, among other types of communication channel. The communication channel 140 may also be communicatively coupled to the monitored processor 106, to the memory 110, or to both. The monitoring processor 122 may retrieve the core dump via the communication channel 140.

In particular embodiments, a channel-to-memory fabric 146 may couple the communication channel 140 to the memory 110. The channel-to-memory fabric 146 may comprise a bridging device or a switch. The channel-to-memory fabric 146 may translate operations associated with the communication channel 140 to operations associated with the memory 110 and vice versa. The monitoring processor 122 may access memory space associated with the monitored processor 106 via a logical window provided by the channel-to-memory fabric 146.

Figure 2:
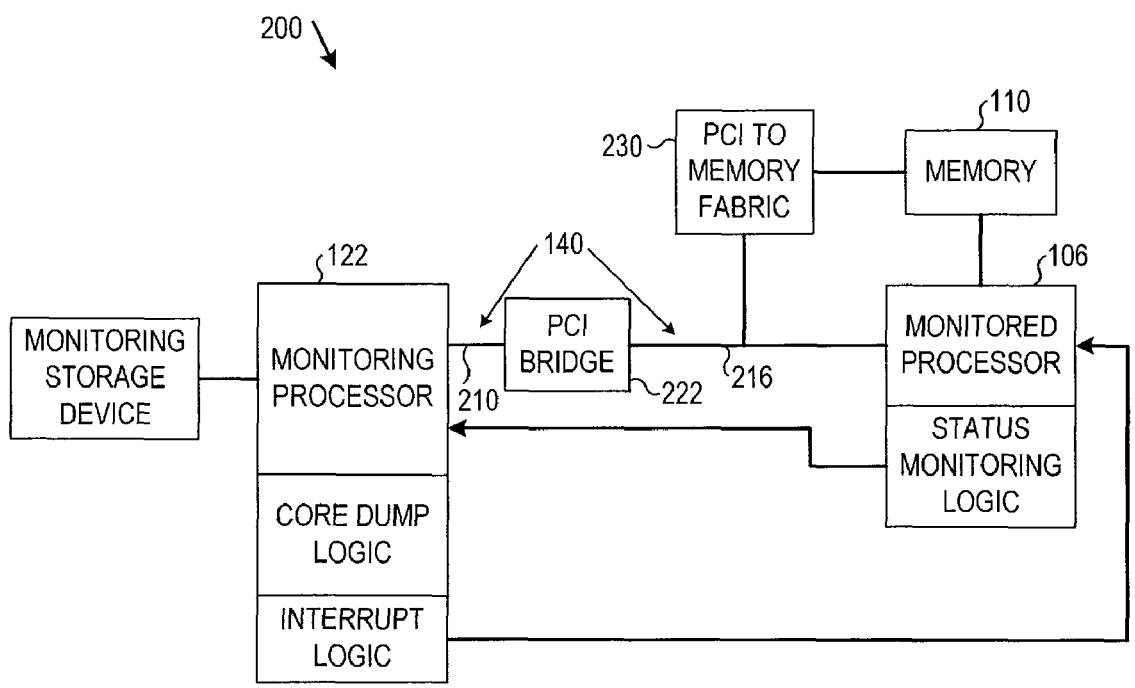

FIG. 2 illustrates an example apparatus 200 for retrieving processor core dumps. The apparatus 200 divides the communication channel 140 into two PCI buses 210 and 216. The monitoring processor 122 is coupled to the PCI bus 210. The monitored processor 106, the memory 110, or both are communicatively coupled to the PCI bus 216. A PCI bridge 222 couples the PCI bus 210 to the PCI bus 216 and isolates the two from each other. The communication channel-to-memory fabric 146 previously described may comprise a PCI-to-memory fabric 230.

Figure 3:
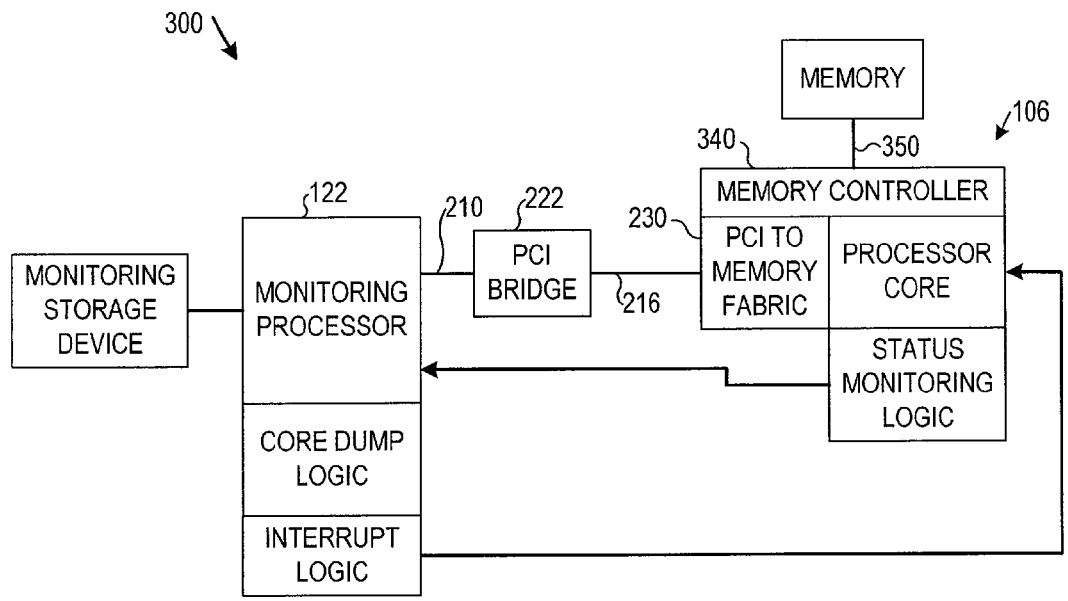

FIG. 3 illustrates an example apparatus 300 for retrieving processor core dumps. The PCI-to-memory fabric 230 may be incorporated into the monitored processor 106. The monitored processor 106 may also include a memory controller 340. The memory controller 340 may be incorporated internally to the monitored processor 106 in particular embodiments. The core dump path may thus traverse a memory bus 350, the memory controller 340, the PCI-to-memory fabric 230, the PCI bus 216, the PCI bridge 222, and the PCI bus 210 to reach the monitoring processor 122.

Figure 4:
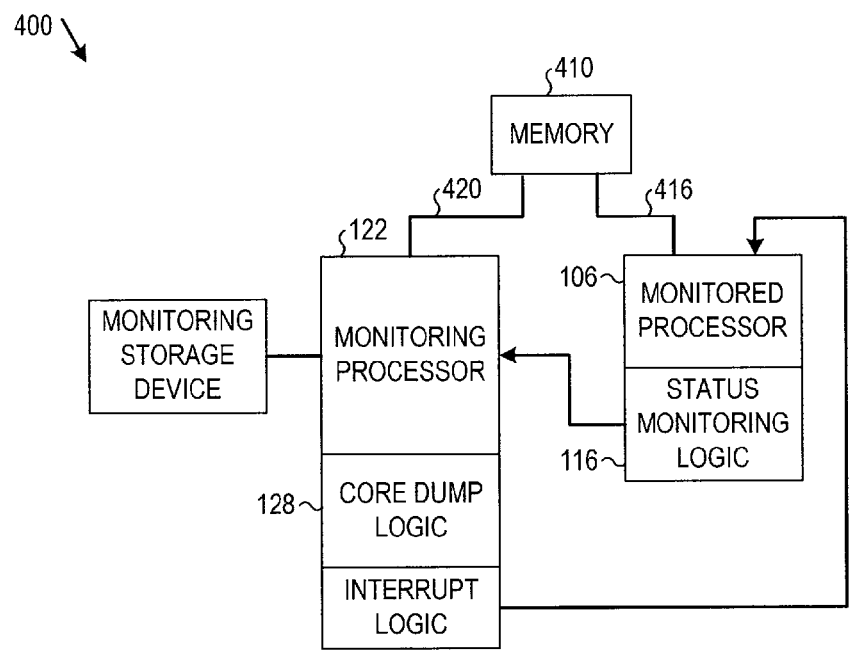

FIG. 4 illustrates an example apparatus 400 for retrieving processor core dumps. The monitored processor 106 may execute processes using a shared memory 410. The shared memory 410 may be coupled to the monitored processor 106 using a memory bus 416. The shared memory 410 may also be coupled to the monitoring processor 122 using a memory bus 420. Upon being advised of an error at the monitored processor 106 by the status monitoring logic 116, the core dump logic 128 may transfer the core dump from the shared memory 410 via the memory bus 420.

Figure 5:
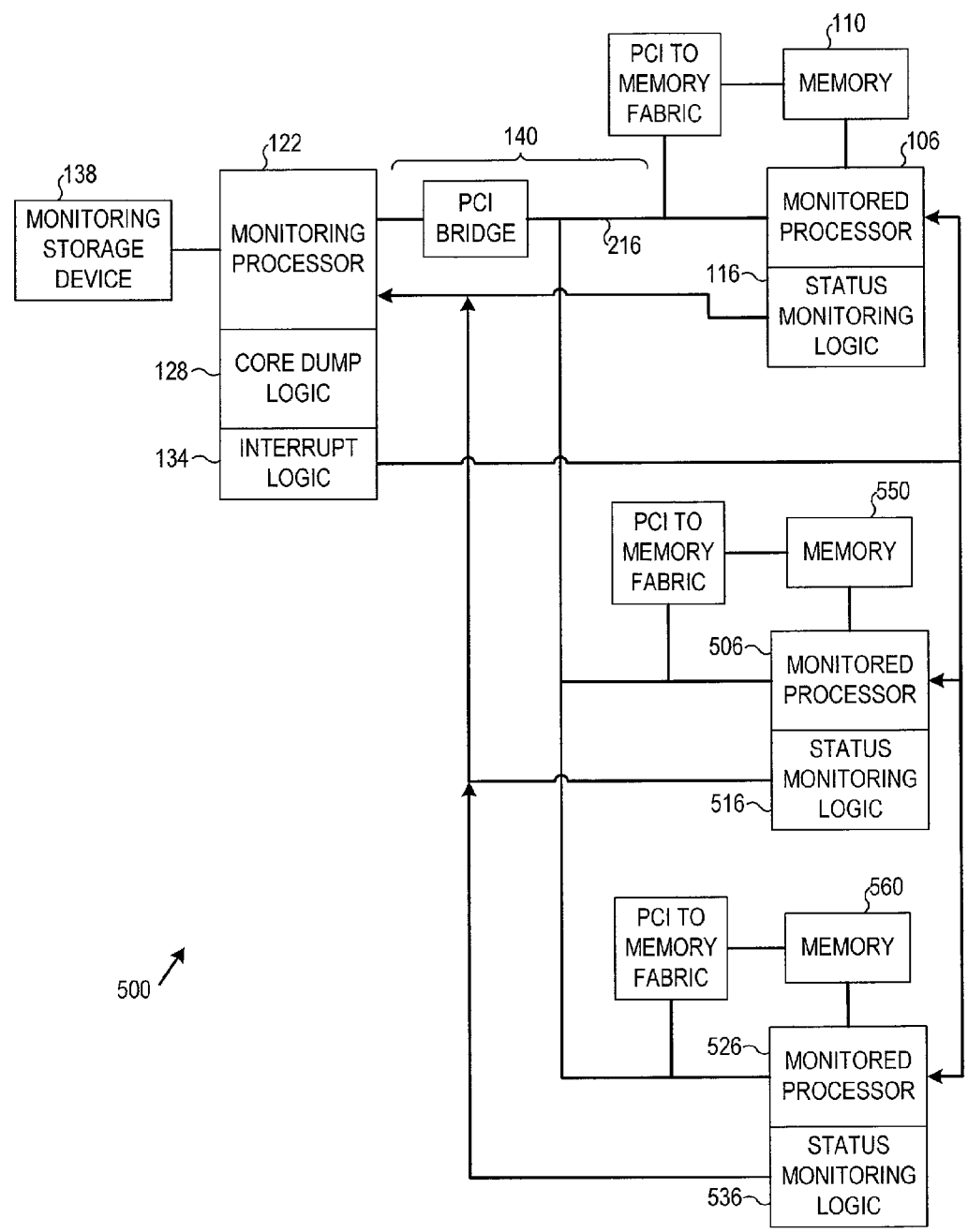

FIG. 5 illustrates an example apparatus 500 for retrieving processor core dumps. Monitored processors 106, 506, and 526 are monitored by status monitoring logic 116, 516, and 536, respectively. That is, the status monitoring logic 116, 516, and 536, may determine whether hardware and software processes are executing on the monitored processors 106, 506, and 526 within a predetermined operational range, as previously described.

For example, the monitored processors 106, 506, and 526 may require that a software process update a status flag no less often than once every ten milliseconds. A software process that does not update the status flag within ten milliseconds may be defined as operating outside of the defined operational range. The status monitoring logic 116, 516, and 536 may detect this condition in the monitored processors 106, 506, and 526, respectively. This is merely an example. The status monitoring logic 116, 516, and 536 may also sense when operational limits associated with other hardware and/or software processes are exceeded.

Any of the status monitoring logic 116, 516, or 536 may interrupt the monitoring processor 122. That is, the status monitoring logic 116, 516, or 536 may exert a signal at control logic associated with the monitoring processor 122. The monitoring processor 122 may subsequently interrupt its normal process flow and pass control to the core dump logic 128. The core dump logic 128 may then cause the interrupt logic 134 to interrupt one or more of the monitored processors 106, 506, and 526 and to place the affected monitored processors 106, 506, and/or 526 in a standby mode of operation.

"Standby mode of operation" as used herein means to render the affected monitored processors 106, 506, and/or 526 either substantially incapable of effecting memory write operations or capable of executing only a limited number of memory write operations. It is noted that a limited number of memory write operations may occur while the monitored processors 106, 506, and/or 526 are transitioning from an active mode to the standby mode. The standby mode of operation may comprise a spin loop, as previously mentioned. The core dump logic 128 may then transfer core dumps from memories 110, 550, and 560 across the communication channel 140 to the monitoring storage device 138. The communication channel 140 may comprise the PCI bus 216 in particular embodiments, as previously described.

Figure 6:
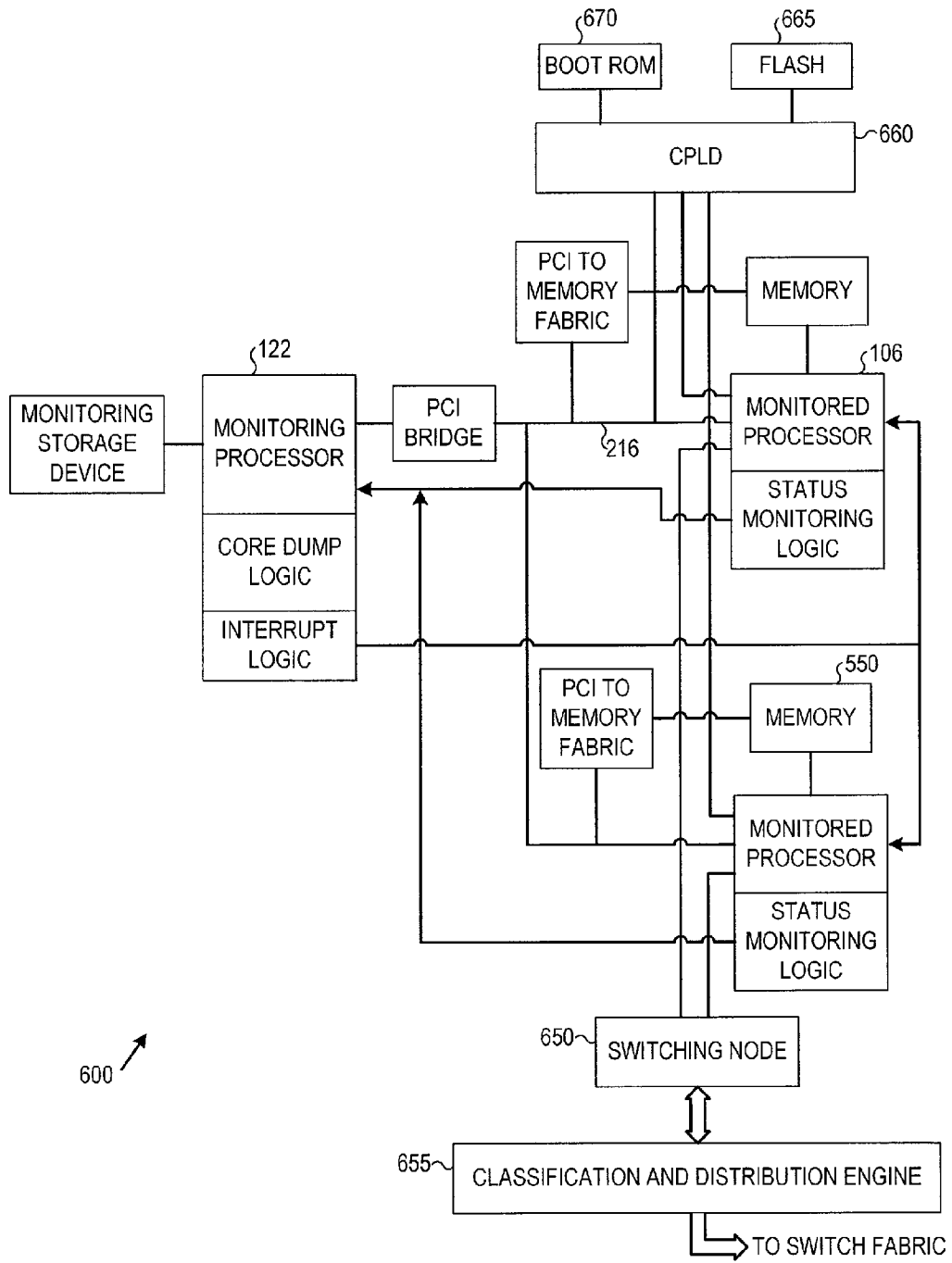
FIG. 6 illustrates an example system for retrieving processor core dumps.

FIG. 6 illustrates an example system 600 for retrieving processor core dumps. The system 600 may include one or more of the apparatus 100, 200, 300, 400, and/or 500. The system 600 may also include a switching node 650 coupled to the plurality of monitored processors 106 and 550. The switching node may switch interprocessor traffic and may aggregate traffic to one or more upstream devices. In particular embodiments the switching node 650 may comprise a field-programmable gate array (FPGA).

In some embodiments the upstream device may comprise a classification and distribution engine 655 coupled to the switching node 650. In particular embodiments the classification and distribution engine 655 comprises one or more processors, gate arrays, logic devices, and/or associated memory used to transfer network packets between a network switching fabric (not shown) and the plurality of monitored processors 106 and 550 for packet content extraction and analysis.

The system 600 may also include a complex programmable logic device (CPLD) 660 coupled to the plurality of monitored processors 106 and 550. The CPLD 660 may arbitrate a bus connecting the monitoring processor 122 to the monitored processors 106 and 550. The arbitrated bus may comprise the PCI bus 216 in particular embodiments. A flash memory device 665 may be coupled to the CPLD. The flash memory device 665 may store executable code associated with one or more of the monitored processors 106 and 550. A bootable read-only memory (ROM) 670 may be coupled to the CPLD 660. The boot ROM 670 may store a boot image associated with processes executed by the monitored processors 106 and 550.

Any of the components previously described may be implemented in a number of ways, including embodiments in software. Software embodiments may be used in a simulation system, and the output of such a system may provide operational parameters to be used by the various apparatus described herein.

Thus, the apparatus 100, 200, 300, 400, 500; the monitored processors 106, 506, 526; the memories 110, 410, 550, 560; the status monitoring logic 116, 516, 536; the monitoring processor 122; the core dump logic 128; the interrupt logic 134; the monitoring storage device 138; the communication channel 140; the channel-to-memory fabric 146; the PCI buses 210, 216; the PCI bridge 222; the PCI-to-memory fabric 230; the memory controller 340; the memory bus 350, 416, 420; the system 600; the switching node 650; the classification and distribution engine 655; the CPLD 660; the flash memory device 665; and the bootable ROM 670 may all be characterized as "modules" herein.

The modules may include hardware circuitry, optical components, single or multi-processor circuits, memory circuits, software program modules and objects, firmware, and combinations thereof, as desired by the architect of the apparatus 100, 200, 300, 400, and 500 and of the system 600 and as appropriate for particular implementations of various embodiments.

The apparatus and systems of various embodiments may be useful in applications other than retrieving core dumps from embedded systems. Thus, the current disclosure is not to be so limited. The illustrations of the apparatus 100, 200, 300, 400, and 500 and of the system 600 are intended to provide a general understanding of the structure of various embodiments. They are not intended to serve as a complete or otherwise limiting description of all the elements and features of apparatus and systems that might make use of the structures described herein.

The novel apparatus and systems of various embodiments may comprise and/or be included in electronic circuitry used in computers, communication and signal processing circuitry, single-processor or multi-processor modules, single or multiple embedded processors, multi-core processors, data switches, and application-specific modules including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may include a number of methods.

Figure 7:
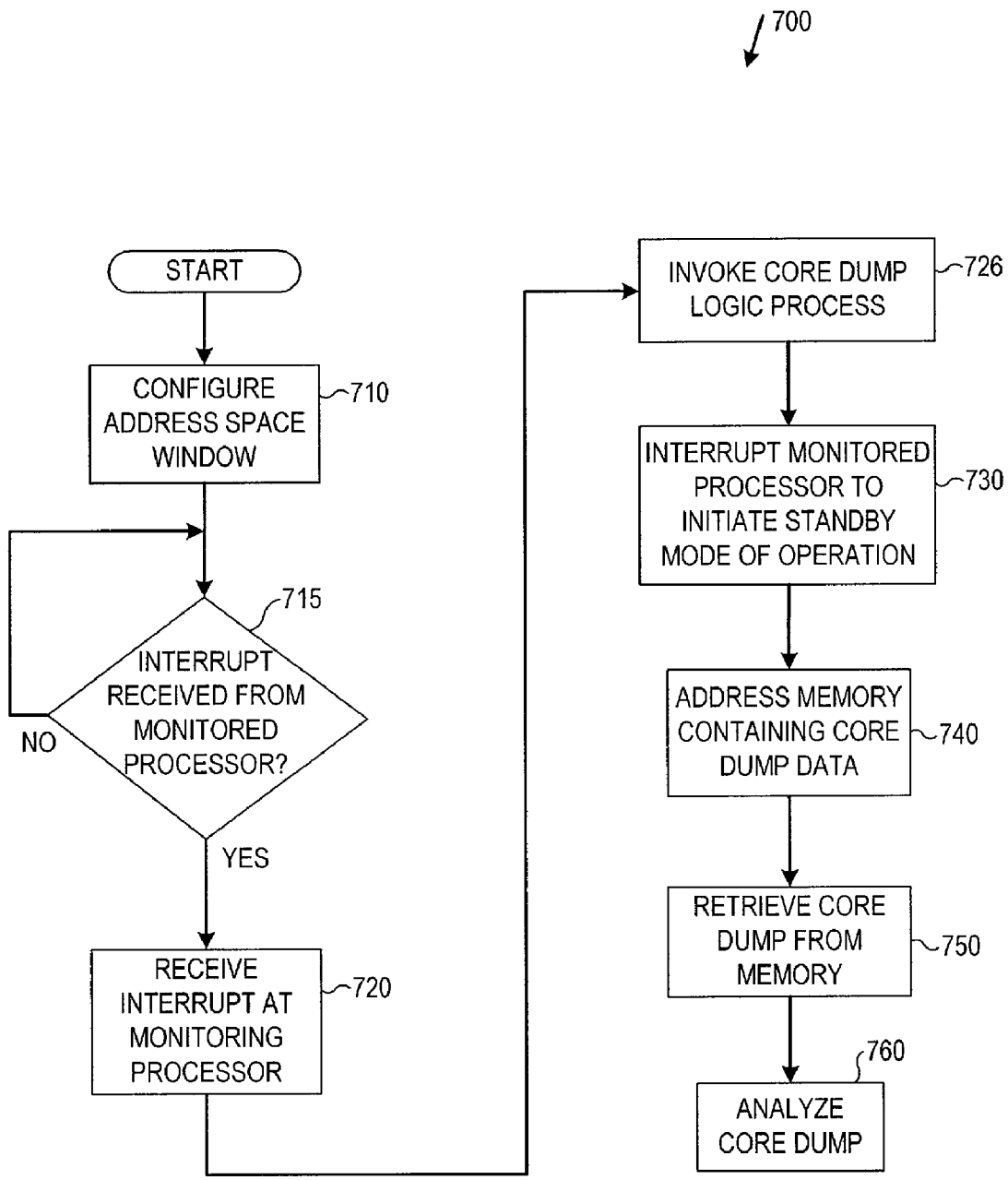
FIG. 7 illustrates an example method for retrieving processor core dumps.

FIG. 7 illustrates an example method 700 for retrieving processor core dumps. The core dumps may be retrieved by a monitoring processor from one or more monitored processors.

A method 700 may commence at block 710 with configuring an address space window in a memory map associated with the monitored processor. Memory mapping is a process whereby some item of digital hardware (e.g., the monitoring processor) is connected to a processor address bus and data bus in such a way that the digital hardware can be accessed as if it were a memory cell. The "address space window" is a range of memory addresses allocated to the monitoring processor by the monitored processor. The address space window may be used by the monitoring processor to access the memory from which the core dump is to be retrieved. In particular embodiments the address space window may be configured using PCI-to-memory fabric logic situated between the monitoring processor and the memory.

The method 700 may also include waiting for an interrupt from a monitored processor, at block 715. The method 700 may continue at block 720 with receiving an interrupt at the monitoring processor signaling an error at one of the monitored processors. The error may comprise a memory violation, a bus error, an illegal instruction, or a user-generated quit signal, among others, as previously described. The interrupt may be generated by status monitoring logic associated with the monitored processor experiencing the error. In particular embodiments the status monitoring logic may be configured as a watchdog timer.

The method 700 may also include invoking a core dump logic process, at block 726. The core dump logic process may be executed by core dump logic such as the core dump logic 128 of FIG. 1. The core dump logic process may interrupt one or more of the monitored processors to initiate a standby mode of operation, at block 730. In particular embodiments the standby mode of operation may comprise a spin loop. Initiating a standby mode of operation in the monitored processors may decrease the likelihood of state changes in the memory from which the core dump is to be retrieved. As a consequence, the core dump may more accurately reflect the state of the memory at the point in time of the occurrence of the error than if the monitored processors were not placed in standby mode.

The method 700 may continue at block 740 with addressing the memory via the address space window into the memory map. The method 700 may also include retrieving the core dump from the memory, at block 750. The core dump may be transferred across a communication channel connecting the monitoring processor to the monitored processors or to one or more memories associated with the monitored processors. In particular embodiments the communication channel may be configured as a PCI bus. The method 700 may terminate at block 760 with analyzing the core dump to characterize the error associated with the errored processor.

The activities described herein may be executed in an order other than the order described. The various activities described with respect to the methods identified herein may also be executed in repetitive, serial, and/or parallel fashion.

A software program may be launched from a computer-readable medium in a computer-based system to execute functions defined in the software program. Various programming languages may be employed to create software programs designed to implement and perform the methods disclosed herein. The programs may be structured in an object-oriented format using an object-oriented language such as Java or C++. Alternatively, the programs may be structured in a procedure-oriented format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The apparatus, systems, and methods disclosed herein may preserve the state of a core dump image associated with an errored state of a monitored processor and may provide timely and accurate retrieval of the core dump image by an independent monitoring processor for later problem analysis. Greater availability of core dump data may result.

The accompanying drawings that form a part hereof show, by way of illustration and not of limitation, particular embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The scope of various embodiments is defined by the appended claims and the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus, comprising:
   a monitored processor;
   a memory associated with the monitored processor;
   status monitoring logic coupled to the monitored processor to detect an error condition associated with an operation of the monitored processor;
   a monitoring processor coupled to the monitored processor to receive an interrupt from the status monitoring logic in response to the error condition; and
   core dump logic associated with the monitoring processor to force the monitored processor into a standby mode of operation and to retrieve a core dump from the memory responsive to the monitoring processor receiving the interrupt.

2. The apparatus of claim 1, further comprising:
   interrupt logic coupled to the core dump logic to generate a high-priority interrupt to initiate the standby mode of operation as a spin loop.

3. The apparatus of claim 1, wherein the status monitoring logic comprises a watchdog timer.

4. The apparatus of claim 1, further comprising:
   a communication channel communicatively coupled to the monitoring processor and to at least one of the monitored processor or the memory to retrieve the core dump.

5. The apparatus of claim 4, wherein the communication channel comprises a peripheral component interconnect (PCI) bus.

6. The apparatus of claim 5, further comprising:
   a PCI-to-memory fabric to couple the PCI bus to the memory.

7. The apparatus of claim 4, wherein the communication channel is divided into two peripheral component interconnect (PCI) buses, the monitoring processor coupled to a first PCI bus and at least one of the memory or the monitored processor coupled to a second PCI bus.

8. The apparatus of claim 7, further comprising:
   a PCI bridge to couple the first PCI bus to the second PCI bus.

9. A system, comprising:
   a plurality of monitored processors;
   a plurality of memories coupled in a one-to-one correspondence to the plurality of monitored processors;
   a plurality of status monitoring logic modules coupled in a one-to-one relationship to the plurality of monitored processors, each status monitoring logic module to detect an error condition associated with an operation of an associated monitored processor;
   a monitoring processor coupled to each of the plurality of monitored processors to receive an interrupt from at least one of the plurality of status monitoring logic modules in response to the error condition;
   core dump logic associated with the monitoring processor to force at least one of the plurality of monitored processors into a standby mode of operation and to retrieve a core dump from a memory associated with at least one of the plurality of monitored processors responsive to the monitoring processor receiving the interrupt; and
   a switching node coupled to the plurality of monitored processors to switch interprocessor traffic and to aggregate traffic to an upstream device.

10. The system of claim 9, wherein the switching node comprises a field-programmable gate array (FPGA).

11. The system of claim 9, further comprising:
    a complex programmable logic device (CPLD) coupled to the plurality of monitored processors to arbitrate a bus connecting the monitoring processor to the plurality of monitored processors.

12. The system of claim 11, further comprising:
    a flash memory device coupled to the CPLD to store executable code associated with at least one of the plurality of monitored processors.

13. The system of claim 9, further comprising:
    a classification and distribution engine coupled to the switching node to transfer network packets between a network switching fabric and the plurality of monitored processors for packet content extraction and analysis.

14. A method, comprising:
    at a monitoring processor, receiving an interrupt from status monitoring logic associated with an errored monitored processor;
    interrupting at least one monitored processor to initiate a standby mode of operation; and
    retrieving a core dump from a memory associated with the at least one monitored processor.

15. The method of claim 14, further comprising:
    configuring the status monitoring logic as a watchdog timer.

16. The method of claim 14, wherein the standby mode of operation comprises a spin loop.

17. The method of claim 14, further comprising:
    configuring a communication channel as a peripheral component interconnect (PCI) bus.

18. The method of claim 14, further comprising:
    addressing the memory via an address space window into a memory map associated with the memory.

19. The method of claim 18, further comprising:
    configuring the address space window using PCI to memory fabric logic situated between the monitoring processor and the memory.

20. The method of claim 14, further comprising:
    analyzing the core dump to determine an error associated with the errored processor.

21. An apparatus, comprising:
    a means for receiving an interrupt from status monitoring logic associated with an errored monitored processor;
    a means for interrupting at least one monitored processor to initiate a standby mode of operation; and
    a means for retrieving a core dump from a memory associated with the at least one monitored processor.

* * * * *